United States Patent Office 3,208,973
Patented Sept. 28, 1965

3,208,973
EQUILIBRATION OF ORGANOPOLYSILOXANES USING PHOSPHORUS-CONTAINING CATALYSTS
Ben A. Bluestein, Schenectady, N.Y., assignor to General Electric Company, a corporation of New York
No Drawing. Filed Dec. 24, 1962, Ser. No. 246,666
3 Claims. (Cl. 260—46.5)

The present invention relates to a method for making a variety of organopolysiloxanes and to the products derived therefrom. More particularly, the present invention relates to the employment of certain phosphorous-containing catalysts for equilibrating various organopolysiloxane mixtures to provide for the production of a variety of organopolysiloxane polymers and copolymers.

In copending application Serial No. 246,667, filed December 24, 1962, and assigned to the same assignee as the present invention, a method is described for making various organopolysiloxane polymers and copolymers by equilibrating organopolysiloxane with an equilibration catalyst formed by mixing water with a particular phosphorous halogen compound such as phosphorous-oxychloride at a temperature sufficient to effect reaction between them. As shown in the aforementioned application, the method is particularly valuable for equilibrating plural phase mixtures of cyclic polydiorganosiloxanes and other organopolysiloxane hydrolyzates to porvide for the production of organopolysiloxane polymers and copolymers of chemically combined carboxyalkyl siloxy units with other organosiloxy units. Also described, is that the equilibration catalyst can be utilized in the form of a premix, or it can be prepared in situ by introducing the phosphorous halogen compound and water separately into the equilibration mixture. Even though advantageous result can be achieved by employing the catalyst in situ or in the form of a premix, it has been found that in instances where the use of an organic solvent was desirable, such as when the equilibration mixture was in plural phases, effective results were only achieved when the catalyst was used as a premix. As a result, in the practice of the invention of the aforementioned application, it often was found to be advantageous to use the equilibration catalyst in the form of a premix, even though forming the catalyst in situ would have been more convenient and in most instances would have minimized material losses.

The present invention is based on the discovery that advantageous results can be obtained by forming the equilibration catalyst in situ in the presence of acetonitrile and the organopolysiloxane. As a result, the present invention provides for the production of a variety of organopolysiloxane polymers and copolymers from plural phase mixtures of organopolysiloxanes in an easy and convenient manner.

In accordance with the present invention there is provided a process for making a polymer having the formula, (1) 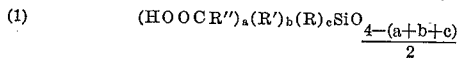

which comprises (1) forming an equilibration mixture composed of (A) 100 parts of organopolysiloxane, (B) 3 to 50 parts of acetonitrile and (C), 0.1 to 10 percent by weight of (A) of an equilibration catalyst and (2), heating (1) to a temperature in the range of from 20° C. to 160° C., where said equilibration catalyst is the product produced by mixing in the presence of (A) and (B), a phosphorous halogen compound and water in a proportion of from about ½ to 10 moles, per mole of water, of said phosphorous halogen compound which is selected from a phosphorous pentahalide and a phosphorous oxygen halide, said organopolysiloxane is selected from (a) An organosiloxane hydrolyzate consisting of components having chemically combined structural units included by the formula, (2) 

(b) A carboxyalkyl hydrolyzate consisting of components having chemically combined structural unit included by the formula, (3) 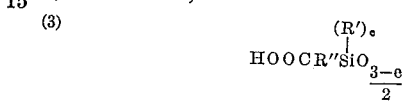

and (c) A mixture of said organosiloxane hydrolyzate and said carboxyalkyl hydrolyzate, and where $a$ is equal to from 0 to 1, inclusive, $b$ is equal to from 0 to 2, inclusive, $c$ is equal to from 0 to 3, inclusive, and the sum of $a$, $b$ and $c$ is equal to from 1.5 to 3, inclusive, D is an integer equal to from 1 to 3, inclusive, $e$ is an integer equal to from 1 to 2, inclusive, R is a member selected from monovalent hydrocarbon radicals, halogenated monovalent hydrocarbon radicals and cyanoalkyl radicals, R' is a member selected from monovalent hydrocarbon radicals and halogenated monovalent hydrocarbon radicals, and R" is an alkylene radical.

Radicals included by R of Formula 1 are aryl radicals and halogenated aryl radicals such as phenyl, chlorophenyl, xylyl, tolyl, etc., aralkyl radicals such as phenylethyl, benzyl, etc.; aliphatic, haloaliphatic and cycloaliphatic such as alkyl, alkenyl, cycloalkyl, haloalkyl, including methyl, ethyl, propyl, chlorobutyl, cycolhexyl, etc., cyanolakyl radicals such as cyanoethyl, cyanopropyl, cyanobutyl, etc. Radicals included by R' of Formula 1 are alkylene radicals, such as ethylene, trimethylene, tetramethylene octamethylene, etc. R and R' can be all the same radicals, respectively, or any two or more of the aforementioned R and R' radicals, R is preferably methyl and R' is preferably ethylene.

The phosphorous halogen compounds utilized in the practice of the invention to form the equilibration catalyst are phosphorous pentahalides such as phosphorous pentachloride and phosphorous pentabromide, and phosphorous oxygen halides such as phosphorous oxytrichloride and phosphorous oxytribromide.

The polymers of Formula 1 include a variety of products such as fluids and gums having viscosities ranging from 10 centipoises or less to as high as $10^8$ centipoises or more. For example, fluids can vary between about 1 to about $10^5$ centipoises at 25° C., or gums can vary between $10^5$ to $10^8$ centipoises at 25° C., or higher. These materials can be employed in conventional applications in which organopolysiloxanes are utilized and possess all of the outstanding advantages generally attributed to organopolysiloxane polymers. For example, the gums made in accordance with the present invention can be employed to make elastomers having superior resistance to heat-age. The fluids can be utilized in lubricating and hydraulic applications and possess valuable high temperature properties.

Some of these polymers can be made by the equilibration of the organosiloxane hydrolyzate shown in Formula 2 which can be composed of up to 100 percent by weight of a cyclopolydiorganosiloxane having the formula,

where R is as defined above and $n$ is an integer equal to from 3 to 10, inclusive. The organosiloxane hydrolyzate of Formula 2 can be obtained by hydrolyzing chlorosilanes included by the formula, (5) $\qquad (R)_dSi(X)_{4-d}$ where R, $d$ and X are as defined above. In addition, copolymers of units shown by Formulae 2 and 3 can be made by equilibrating mixtures of the cyclics of Formula 4 with or without hydrolyzates composed of other units included by Formula 2, and with hydrolyzates composed of carboxyalkylsiloxy units of Formula 3 to provide for the production of carboxyalkyl copolymers, where $a$ in Formula 1 is equal to .001 to 1 and preferably .001 to 0.1, inclusive, $b$ is equal to 0 to 2 and preferably 0 to 0.2, inclusive, $c$ is equal to from 1.5 to 2.009, and the sum of $a$, $b$ and $c$ is equal to 1.9 to 2.01, inclusive. Hydrolyzates having units shown by Formula 3 can be formed by the method of Bluestein, Patent 2,900,363 involving the hydrolysis in hydrochloric acid of cyanoalkylchlorosilanes, included by Formula 5 and more particularly by the following formula,

where R, R″, $e$ and X are as defined above.

The polymers of Formula 1 also include fluids and gums that are made by the equilibration of hydrolyzate of units of Formula 2 or Formula 3, or mixtures thereof, free of the cyclics of Formula 4 but which contain chain-stopping units of the formula, (7) $\qquad \begin{matrix} (R''')_2 \\ | \\ ZSiO_{.5} \end{matrix}$ where R‴ can be R or R′, or a mixture thereof, and Z can be HOOCR″, R, or R′.

In the practice of the invention, an equilibration mixture is formed by mixing the phosphorous halogen compound and water together in the presence of acetonitrile and the organopolysiloxane. The resulting mixture is then equilibrated to provide for the production of a variety of organopolysiloxane polymers and copolymers.

In forming the catalyst in situ, the order of addition of either the water or phosphorous halogen compound to the mixture of acetonitrile and organopolysiloxane is not critical. The equilibration of the organopolysiloxane can be accomplished in accordance with conventional procedures such as described on page 83 of Rochow, Chemistry of the Silicones. Temperatures that can be utilized can vary in the range of between 20° C. to 160° C., while a preferred range is 30° C. to 100° C. The termination of the reaction can be determined by such factors as disappearance of multiple phases and the production of a clear mixture, increase in viscosity to a predetermined amount, etc.

Reaction times will vary in accordance with the temperature utilized and the amount of catalyst formed in the equilibration mixture. As little as 1 hour or less, to as long as 24 hours or more will, therefore, not be unusual. The final equilibrated product then can be stripped of solvent, volatile materials, etc.

The process of the present invention provides for the production of a variety of polymers and copolymers including fluids and gums as shown in Formula 1 which can be modified by the incorporation of various ingredients such as thickeners to form greases, fillers to form elastomers, etc. The products produced in accordance with the present invention have all the desirable properties normally possessed by conventional organopolysiloxane compositions.

In order that those skilled in the art will be better able to practice the invention, the following examples are given by way of illustration and not by way of limitation. All parts are by weight.

EXAMPLE 1

A carboxyethylmethyl hydrolyzate was made by refluxing a mixture of methylcyanoethyldichlorosilane and concentrated hydrochloric acid for about 70 hours, where there was present in the mixture, a proportion of 3 parts of hydrochloric acid per part of the methylcyanoethyldichlorosilane. The hydrolyzate was separated from the acid layer and washed with a saturated solution of sodium chloride and water.

Various organopolysiloxane mixtures were prepared composed of the above carboxyethylmethyl hydrolyzate, and octamethylcyclotetrasiloxane which contained carboxyethylmethyl hydrolyzate in proportions of from 0.3% to 10% by weight based on weight of organopolysiloxane. To each of the respective mixtures there was added varying amounts of acetonitrile ranging from 7.1 parts to 13.1 parts per 100 parts of organopolysiloxane and 13 to 14.4 parts of various organic solvents. Equimolar amounts of phosphorous-oxychloride and water were added to the respective mixtures in proportions sufficient to provide for the in situ formation of 0.1 part of equilibration catalyst per 100 parts of organopolysiloxane. The other organic solvents employed were benzene, ethyl ether and ethyl acetate. The various mixtures were heated for 20 hours at 80° C. followed by 8 hours at 130° C. to 140° C.

Table I shows the results obtained with the various equilibration mixtures composed of organic solvent, organopolysiloxane, and catalyst, where "Carboxy" signifies weight of the carboxyethylmethyl hydrolyzate, based on 100 parts of organopolysiloxane mixture and "N.P." signifies no polymerization.

*Table I*

| Solvent | Parts of mixture based on 100 parts of siloxane | | Product |
|---|---|---|---|
| | Solvent | Carboxy | |
| Benzene | 13 | 0.3 | N.P. |
| Ethyl ether | 13 | 0.3 | N.P. |
| Ethyl acetate | 14.4 | 0.3 | N.P. |
| Acetonitrile | | 0.3 | Gum. |
| Do | 13 | 1.0 | Gum. |
| Do | 7 | 3.0 | Gum. |
| Do | 7 | 5.0 | Gum. |
| Do | 13 | 10.0 | Gum. |

EXAMPLE 2

Equilibration mixtures composed of octamethylcyclotetrasiloxane, decamethyltetrasiloxane, carboxyethylmethyl hydrolyzate, acetonitrile and equilibration catalyst prepared in situ were made in accordance with the procedure of Example 1. The respective organopolysioloxane mixtures contained about 4% by weight, based on the weight of organopolysiloxane of decamethyltetrasiloxane, 0.7, 2.6, and 10.2 percent by weight of organopolysiloxane of the carboxyethylmethyl hydrolyzate, 10% by weight of acetonitrile and 0.1 percent by weight of equilibration catalyst. The mixtures were heated at a temperature between 55 to 65° C. for about 18 hours, and then the product was stripped at a temperature of 150° C. at about 4 millimeters' Hg pressure.

Similar organopolysiolxane mixtures were made utilizing concentrated sulphuric acid both as a solvent and equilibration catalyst containing respectively 1.2 and 4.4 percent by weight of carboxyethylmethyl hydrolyzate based on the weight of mixture. In preparing the mixtures containing sulphuric acid, the carboxyethylmethyl hydrolyzate was initially dissolved in about 25 to 50 parts of concentrated sulphuric acid, per part of carboxyethylmethyl hydrolyzate, and the resulting solution was thereafter mixed with about 550 parts of octamethylcyclotetrasiloxane and about 12 parts of hexamethyldisiloxane. The organopolysiloxane mixtures containing the sulphuric acid were then stirred at room temperature for about 10 hours and the respective equilibrates were separated from the sulphuric acid and washed with water, and thereafter vacuum stripped utilizing the same conditions as employed to strip the above organopolysiloxane equilibrates prepared in accordance with the practice of the invention. The various equilibrates formed by the practice of the present invention and the prior art method utilizing sulphuric acid, were then heated to 200° C. over an extended period of time to determine their thermal stability as measured in terms of weight lost based on the weight of the original sample. Table II shows the heat stability of the various fluid copolymers as well as some of the properties of the fluid copolymers, prepared in accordance with the invention. In Table II, "Viscosity" is represented in centipoises as measured at 110° F., "Carboxy" represents weight percent carboxy in the fluid copolymer, and "Wt. loss" represents the percent change in weight based on the original weight of the fluid copolymer.

Table II

| Catalyst | Carboxy | Viscosity | Wt. Loss, 200° C./24 Hrs. |
|---|---|---|---|
| In Situ | 0.7 | 385 | 4 |
|  | 2.6 | 834 | 7 |
|  | 10.2 | 1,780 | 11 |
| H₂SO₄ | 1.23 | -------- | 15 |
|  | 4.4 | -------- | 19 |

Based on the above results, one skilled in the art would know that the method of the present invention provides for the production of a variety of valuable organopolysiloxane gums, fluids and copolymers by the equilibration of mixtures of carboxyethylmethyl hydrolyzate, and cyclic polydiorganosiloxanes. Table I, for example, shows the unexpected results achieved with acetonitrile, as compared to other organic solvents, by advantageously providing for a method for making organopolysiloxane copolymers by forming the equilibration catalyst in situ in an easy and desirable manner. The advantages achieved thereby provide for a convenient method for equilibrating mixtures of organopolysiloxanes to produce a variety of organopolysiloxane polymers and copolymers with the catalyst produced from water and the phosphorous halogen compounds of the present invention. Table II shows that the fluid copolymers made by the practice of the present invention have superior heat stability as compared to those produced by the method of the prior art.

While the foregoing examples have of necessity been limited to only a few of the many variables within the scope of the present invention, it should be understood that the present invention covers a much broader class of organopolysiloxane compositions which can be prepared by the equilibration of units shown in Formula 2 and Formula 3.

What I claim as new and desire to secure by Letters Patent of the United States is:

1. A method which comprises, (1) forming an equilibration mixture composed of (A) an organopolysiloxane, (B) acetonitrile, and (C), an equilibration catalyst, and (2) heating said mixture of (1) to a temperature in the range of from 20° C. to 160° C., where there is utilized in said equilibration mixture per part by weight of (A), from .03 to 0.5 part of (B), and from .001 to 0.1 part of (C), said equilibration catalyst is a product produced by mixing in the presence of (A) and (B), a phosphorous halogen compound and water, in a proportion of from about 0.5 to 10 moles of said phosphorous halogen compound per mole of water, said phosphorous halogen compound is a member selected from the class consisting of a phosphorous pentahalide and a phosphorous oxygen halide, and said organopolysiloxane is a member selected from the class consisting of (a) carboxyalkylpolysiloxane consisting essentially of chemically combined siloxy units having carboxyethyl radicals attached to silicon, and (b) a mixtuer of said carboxyalkylpolysiloxane and organosiloxane consisting essentially of chemically combined siloxy units having methyl radicals attached to silicon, to provide for the production of carboxyalkylpolysiloxane polymer having a ratio of about 1.5 to 3 methyl and carboxyethyl radicals per silicon atom.

2. The method of claim 1, where the phosphorous halogen compound is a phosphorous oxygen halide.

3. The method of claim 2, where the phosphorous oxygen halide is phosphorous-oxychloride.

References Cited by the Examiner

FOREIGN PATENTS 504,451  7/54  Canada.

OTHER REFERENCES

Partington, "A Textbook of Inorganic Chemistry," 1953, page 578, MacMillan and Co., Ltd., London.

LEON J. BERCOVITZ, *Primary Examiner.*

WILLIAM SHORT, MURRAY TILLMAN, *Examiners.*